United States Patent [19]

Tse

[11] Patent Number: 4,539,216

[45] Date of Patent: Sep. 3, 1985

[54] PROCESS FOR PREPARING TEA PRODUCTS

[75] Inventor: Hing C. Tse, Fairfield, Ohio

[73] Assignee: The Procter & Gamble Co., Cincinnati, Ohio

[21] Appl. No.: 614,419

[22] Filed: May 25, 1984

[51] Int. Cl.³ .............................................. A23F 3/16
[52] U.S. Cl. ................................................... 426/597
[58] Field of Search ........................................ 426/597

[56] References Cited

U.S. PATENT DOCUMENTS

| | | |
|---|---|---|
| 726,102 | 4/1903 | Roger et al. . |
| 1,854,062 | 4/1932 | Potter et al. . |
| 2,476,072 | 7/1949 | Tressler . |
| 2,785,979 | 3/1957 | Mitchell . |
| 2,891,865 | 6/1959 | Seltzer et al. . |
| 2,963,368 | 12/1960 | Greenbaum . |
| 3,163,539 | 12/1964 | Barch . |
| 3,392,028 | 7/1968 | Vuataz ........................ 426/597 X |
| 3,519,441 | 7/1970 | Ferrara et al. . |
| 4,410,556 | 10/1983 | Lunder et al. ...................... 426/597 |

FOREIGN PATENT DOCUMENTS 2112624 7/1983 United Kingdom ................ 426/597

OTHER PUBLICATIONS

Bokuchave, M. A., and Skobeleva, N. I., "The Biochemistry and Technology of Tea Manufacture", CRC Critical Reviews in Food Science and Nutrition, vol. 12, issue 4, pp. 303-370, Jul. (1980).
Stahl, W. H., "The Chemistry of Tea and Tea Manufacturing", Advances in Food Research, vol. 11, pp. 201-241 (1962).
Wickremasinghe, R. L., "Tea", Advances in Food Research, vol. 24, pp. 229-263 (1978).
Sanderson, G. W., "Chemistry of Tea", Structural and Functional Aspects of Phytochemistry, Runeckles and Tso, Ed., Academic Press, New York, NY, pp. 258-259, 292-297 (1972).

Primary Examiner—Joseph Golian
Attorney, Agent, or Firm—Nancy S. Mayer; Rose Ann Dabek; Richard C. Witte

[57] ABSTRACT

The present invention comprises a process for the preparation of shelf-stable tea concentrates and tea powders wherein a tea extract is prepared, acidified, and heated; off-flavor and malodorous compounds are removed from the extract; the extract is cooled and precipitates are removed from it; and flavoring and sweetener are blended with the clarified extract. The acidification and heating steps accelerate acid-catalyzed degradation reactions that normally occur causing the development of off-flavor sulfurous compounds and precipitates. By forcing these components to react, removing the resultant volatile compounds, and separating the precipitates formed, the development of these off-flavors, off-aromas, and precipitates in the resultant tea product is prevented. The tea product is shelf stable and use of preservatives such as antioxidants or antimicrobial agents is not needed.

15 Claims, 7 Drawing Figures

RETENTION TIME (MINUTES)

Fig. 3

RETENTION TIME (MINUTES)

RETENTION TIME (MINUTES)

PROCESS FOR PREPARING TEA PRODUCTS

FIELD OF THE INVENTION

The present invention comprises a process for the preparation of shelf-stable tea products such as concentrates or granular instant teas. The present invention also comprises the products prepared by such a process.

BACKGROUND OF THE INVENTION

Tea products are most commonly available commercially in the U.S. as granular instant teas, or as ready-to-drink canned products. Liquid tea concentrates are sold primarily to food-service or institutional customers, rather than directly to the consumer. The concentrates, like instant tea, require the addition of water to prepare a tea beverage for consumption.

Acid-catalyzed degradation reactions occur, over time, in liquid tea products resulting in the development of off-flavor compounds and precipitates. The tea solids react with acid to form off-flavor and malodorous compounds. If sugar is present it can react with the acid in the tea to develop off-flavor volatiles such as furfural. Also, if lemon is present acid-catalyzed degradation of limonene to terpenes can occur.

These degradation reactions are limited in dry instant tea products due to the dry matrix but do occur in the beverages prepared by dissolving the instant tea in water. For liquid tea concentrates, the problem of degradation occurs prior to beverage preparation due to the liquid matrix and to the high concentration of the components. Those liquid tea mix concentrates currently available commercially avoid degradation reactions by omitting tea as a component. A tea essence or tea aromatics are substituted. Since no real tea solids are present, degradation reactions are limited.

Most of the liquid tea products commercially available contain preservatives to aid in preventing product degradation. Antimicrobial agents are commonly employed to assure product safety. Antioxidants are used to prevent or retard oxidative decomposition. After an extended period of time these preservatives lose effectiveness and can degrade into other compounds.

Except for the use of such additives, the current processes for the preparation of tea products make no provision for control or prevention of degradation reactions between tea product components. Prior art processes address primarily degradation reactions in the areas of microbial spoilage and oxidation reactions. Other possible degradation reactions appear to have received little attention. Typical tea processing includes the following steps: extraction of tea from tea leaves, precipitation of tannin-caffeine complexes (cream), separation of these precipitates, and concentration of the resulting clarified liquid. For instant products this is followed by dehydration, agglomeration, and aromatization. For example, see U.S. Pat. No. 2,891,865 of Seltzer et al., issued June 23, 1959. This patent discloses a process for preparing liquid tea concentrates and powders wherein tea is countercurrently extracted, and the volatiles are stripped and condensed to form an aroma concentrate. The creaming operation is carefully controlled with respect to tea solids, time, and temperature, to achieve a balanced concentration of tannins and caffeine. Finally, the aroma and decreamed concentrates are combined.

Two references disclose tea processing wherein acid is added to tea extract. U.S. Pat. No. 2,785,979 of Mitchell, issued Mar. 19, 1957, employs acidification to maximize tea solids in tea extracts. After a cold water extraction, the residual tea leaves are extracted with acidified hot water. The residue is then acidified to pH 4, heated, and autoclaved to remove additional soluble material from the cells of the leaves. The cold water, acidified hot water, and acidified autoclaved extracts are then combined. U.S. Pat. No. 1,854,062 of Potter et al., issued Apr. 12, 1932, acidifies hot tea extract, or tea extract after cooling, to coagulate the cream precipitates, thereby rendering them more filterable. It is recognized that acidification appears to cause further precipitation, but ease of separation of the precipitates is the object of the invention.

It is recognized by the prior art that sulfur groups can participate in degradation reactions. U.S. Pat. No. 3,519,441 of Ferrara et al., issued July 7, 1970, discloses a process for treating flour or starch to eliminate free SH groups. The flour or starch is heated to 220° F. to 305° F. (104° C. to 152° C.) and contacted with steam under pressure. This treatment chemically modifies the flour or starch so that no free SH groups are present. The treated flour or starch is storage-stable and does not become rancid.

Iced tea beverages prepared from currently available commercial tea products are stable for only a short time in the refrigerator. Even if preservatives are present, iced tea beverages will become turbid, usually within about one week, because the components interact in degradation reactions to form precipitates. Eventually off-flavors develop. Even the tea products that contain no tea develop a certain low level of turbidity and become cloudy in appearance. It is desirable for consumers to have a convenient product without preservatives containing tea which is shelf-stable. Clearly, it is advantageous for the beverage prepared from such a product to be stable and not develop off-flavors and precipitates upon storage in the refrigerator.

Accordingly, it is an object of this invention to provide a process for the preparation of a shelf-stable tea product.

It is a further object of this invention to provide a process for the preparation of a stable liquid tea concentrate or liquid tea mix concentrate which contains real tea without containing preservatives.

It is a further object of this invention to provide a process for the preparation of a liquid tea concentrate or liquid tea mix concentrate which does not develop off-flavors or off-aroma upon storage at room temperature.

It is a further object of this invention to provide a process for the preparation of tea products from which an iced tea beverage can be prepared that does not develop off-flavors upon storage.

It is a further object of this invention to provide a process for the preparation of tea products from which an iced tea beverage can be prepared that does not develop turbidity or precipitates upon storage.

SUMMARY OF THE INVENTION

The present invention comprises a process for the preparation of shelf-stable tea products and the products prepared thereby. In the process of the present invention a tea extract is prepared, acidified, and heated; off-flavor and malodorous compounds are removed from the extract; the extract is cooled and precipitates are removed from it; optionally, flavoring and sweetener are blended with the clarified extract, and optionally the extract is dried to a granular or powdered form. The acidification and heating steps accelerate acid-catalyzed degradation reactions that normally occur causing the development of off-flavor sulfurous compounds and precipitates. By forcing these reactions to occur, removing the resultant volatile compounds, and separating the precipitates formed, the development of these off-flavors, off-aromas, and precipitates in the resultant tea product is prevented. The tea product is shelf-stable and use of preservatives such as antioxidants or antimicrobial agents is not needed. Tea beverage prepared from the product is storage-stable in flavor and clarity.

DESCRIPTION OF PREFERRED EMBODIMENT

The present invention comprises a process for the preparation of shelf-stable tea products and the resulting products, including liquid concentrates and instant teas. The process for the preparation of the tea products comprises: (a) mixing tea with water; (b) acidifying and heating the extract of step (a) to yield an acidified tea extract; (c) removing volatiles from the extract of step (b); and (d) cooling and separating solids from the extract of step (c) to yield a tea concentrate. Sweeteners, flavorings, or a mixture thereof, can optionally be added to the concentrate. The tea concentrate optionally can be dried to a powdered or granular form if desired. The tea product prepared by this process is shelf stable. The development of off-flavor and off-aroma compounds is substantially prevented. Tea beverage prepared from the tea products is stable to flavor degradation and physical phase separation when refrigerated.

The term "dehydrated tea extract" is used herein to refer to a pure tea brew which has been dried, such as by spray drying or an equivalent means.

The term "tea mix" is used herein to mean tea to which has been added a sweetener, an acidulant, and an optional flavoring.

The term "liquid tea concentrate" is used herein to refer to a concentrated tea extract which must be diluted with water prior to consumption.

The term "liquid tea mix concentrate" is used herein to mean a tea extract which has been concentrated and to which has been added a sweetener, an acidulant, and an optional flavoring and which must be diluted with water prior to consumption.

The term "granular tea", "powdered tea", or "instant tea" is used herein to mean commercially available dry tea products.

The term "tea beverage" is used herein to refer to one of the above-defined products diluted with water as consumed.

It has now been determined that the degradation reactions which occur in tea mix products resulting in off-flavor and malodorous compounds are acid-catalyzed reactions. Tea mix products commonly contain lemon as a flavoring and citric acid as an acidic component. For tea products without these additional components acid is present at a lower level in the tea solids. This explains why use of antioxidants has not been effective to prevent product degradation. Oxidation reactions are only one type of degradation reaction. Acid-catalyzed reactions comprise a pathway for flavor degradation. By use of the process of the present invention, acid-catalyzed reactions are forced to occur and the reaction products removed. Thus, the occurrence of these reactions is prevented in the product resulting in product stability.

Figure 1:
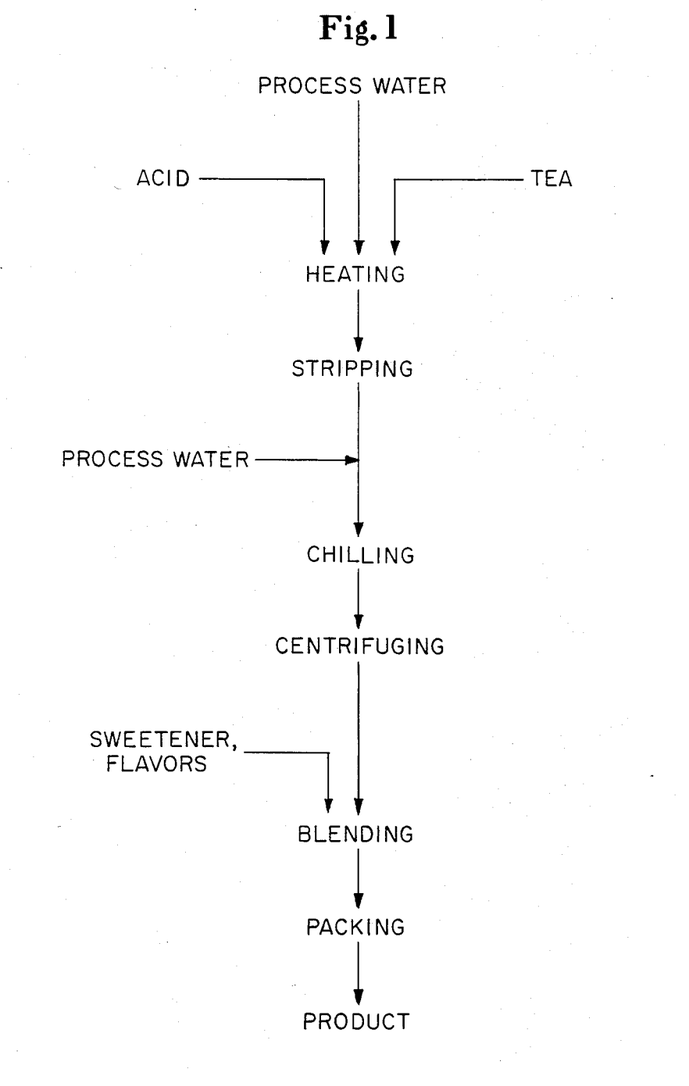
FIG. 1 represents the steps of the process of the present invention.

The steps of the process of the present invention are summarized in FIG. 1. The first step of the process of the present invention comprises mixing tea with water. The tea can comprise comminuted tea leaves or dehydrated tea extract. When tea leaves are employed, a ratio of tea leaves to water of from about 1:3 to about 1:50 by weight is suitable for use herein. A ratio of tea leaves to water of about 1:10 to 1:30 by weight is preferred. The tea leaves are extracted at a temperature of from about 100° F. (38° C.) to about 210° F. (99° C.) for about 3 to about 100 minutes, preferably at about 170° F. (77° C.) for about 15 to about 30 minutes. The mixing preferably occurs in a slurry tank, steam jacketed kettle with means for agitation, or other similar suitable equipment. The tea leaves are then separated by means of a decanter centrifuge or other equivalent means known to those skilled in the art.

The extraction can be performed in single batches, as a continuous process, as a countercurrent multiple vessel process, or as a combination of the above. Tea aroma components volatilized can be collected, condensed, and added back to the extract at a later point in the process. Many variations of extraction processes are known in the art. A process which avoids harshness of the final tea beverage and preserves the real tea flavor is desirable.

When the tea comprises dehydrated tea extract, from about 0.5% to about 30% by weight of dehydrated tea extract is employed in the tea-water mixture. The mixing preferably occurs in a slurry tank, steam jacketed kettle with means for agitation, or other similar suitable equipment. The water can be heated prior to addition of the dehydrated tea extract.

To the tea extract, sweetener, flavorings, colorants, and other optional ingredients can be added. These are blended in at ambient temperature with agitation for about one hour. Preferably these components are added at a later step in the process. It is believed their effectiveness is enhanced if heating steps are avoided after their addition.

The second step of the process of the present invention comprises acidifying and heating the tea-water mixture. Acid in an amount of from about 0.05% to about 40% by weight of the tea-acid water mixture is employed. Suitable acids include foodgrade organic or inorganic acids. In general, any food compatible acid, or combination of food compatible organic and inorganic acids, is acceptable for lowering the pH. Edible organic acids which can be used herein include fumaric, citric, malic, acetic, lactic, propanoic, adipic, tartaric, succinic and the like. A certain level of inorganic acids may also be used for lowering the pH. These include phosphoric, carbonic, sodium hydrogen phosphate, and other suitable acids. Preferred for use herein are citric, malic, or phosphoric acid. Certain acids and combination of acids will provide more acceptable flavor, depending upon the product composition.

Figure 2:
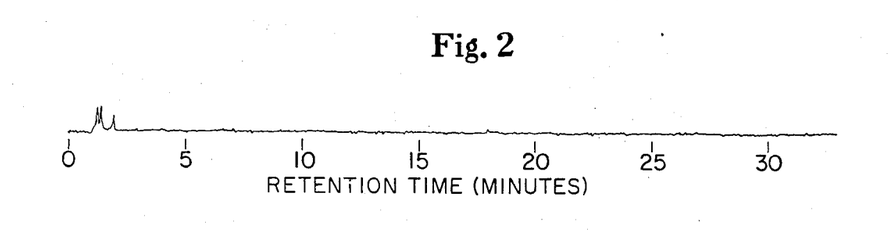
FIG. 2 represents a trace of a gas chromatogram of dehydrated tea extract, citric acid, and distilled water.
Figure 3:
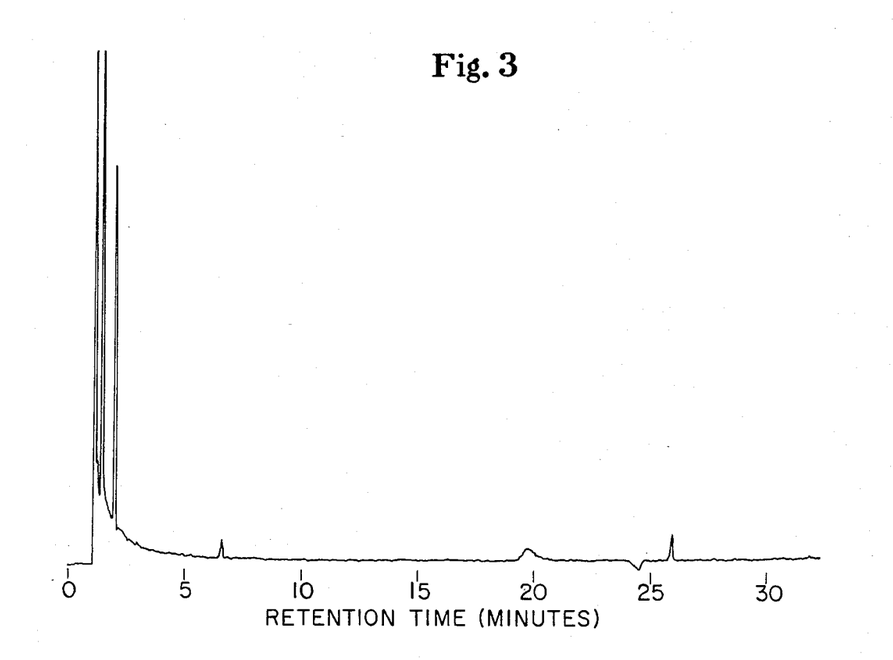
FIG. 3 represents a trace of a gas chromatogram of the composition of FIG. 2 after aging 7 to 10 days at 120° F. (49° C.).
Figure 4:
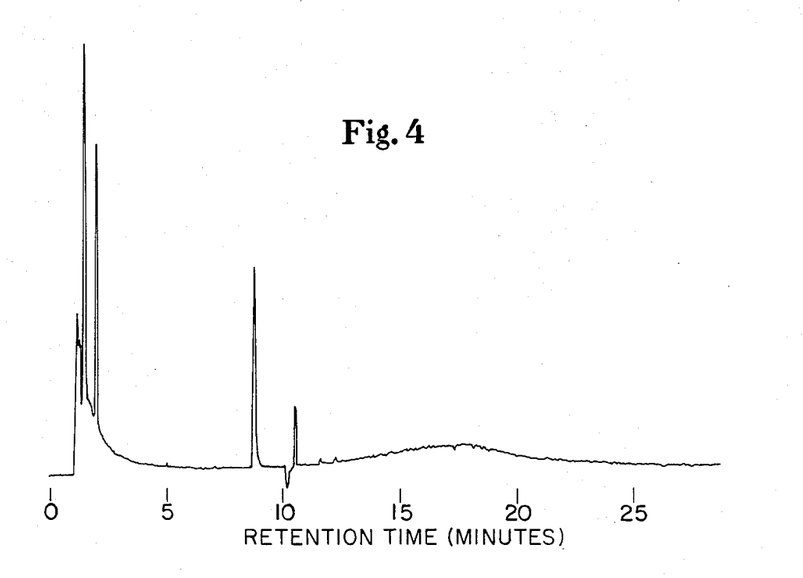
FIG. 4 represents a trace of a gas chromatogram of dehydrated tea extract, citric acid, and distilled water, heated at 170° F. (77° C.) for 2 hours.

The acidified mixture is then heated to at least 120° F. (49° C.), preferably to at least 170° F. (77° C.) for about 15 minutes to about 4 hours, preferably for about one hour. This accelerates degradation reactions that normally occur later between components in the tea product reducing its shelf stability. The degradation reaction which is believed to be the reaction of the tea solids with acid to form volatile sulfur compounds. Sulfur-containing amino acids such as methionine, cystine, and cysteine could be one source of reactants. If sugar is present it reacts with the acid to develop off-flavor volatiles such as furfural. Also, if lemon is present acid-catalyzed degradation of limonene to terpenes can occur. These reactions generate malodorous volatiles as well as off-flavor compounds and precipitates. This is illustrated by FIGS. 2 to 4. FIG. 2 is a trace of a gas chromatogram of dehydrated tea extract, citric acid, and distilled water, and FIG. 3 is a gas chromatogram of the same composition aged about 7 to 10 days at 120° F. (49° C.). The peaks on FIG. 3 represent volatile sulfur compounds resulting from degradation reactions which occurred as the product aged. FIG. 4 is a trace of a gas chromatogram of dehydrated tea extract, citric acid, and water heated at 170° F. (77° C.) for about two hours. This figure demonstrates that heating can force the degradation reactions to occur since peaks similar to those of FIG. 3 were obtained.

Figure 5:
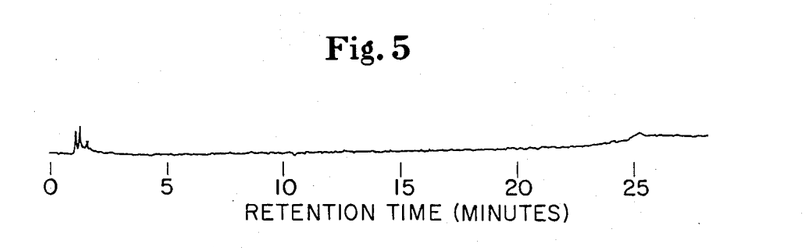
FIG. 5 is a trace of a gas chromatogram of the composition of FIG. 4 after vacuum stripping of volatiles and removal of precipitates according to the process of the present invention.
Figure 7:
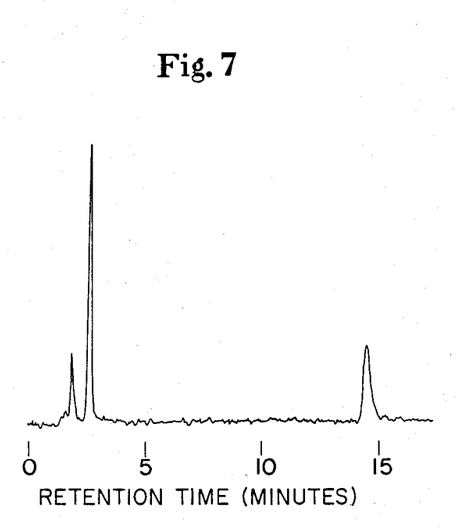
FIG. 7 is a trace of a gas chromatogram of dehydrated tea extract, citric acid, and distilled water heated at 170° F. (77° C.) for 2 hours, cooled, and centrifuged to remove precipitates with no removal of volatiles.

The third step of the process of the present invention is removal of sulfur-containing and other malodorous volatiles. Suitable methods include stripping, evaporation, flash evaporation, and vigorous boiling. The preferred technique is stripping, such as vacuum stripping. Any of the techniques known in the art for vacuum stripping can be employed. Preferably, a vacuum of from about 14 to about 27 inches of mercury is applied for about 3 to about 4 hours while heating the acidified tea extract. Other equivalent stripping techniques, such as steam stripping or inert gas stripping, can also be employed. FIG. 5 is a trace of a gas chromatogram for a mixture of dehydrated tea extract, citric acid, and distilled water, processed according to the process of this invention. This figure demonstrates that vacuum stripping of the heated acidified extract removes the malodorous volatile sulfur compounds resulting from the degradation reactions. For comparison, FIG. 7 is a trace of a gas chromatogram for a mixture of dehydrated tea extract, citric acid, and distilled water processed according to the process of this invention except that the volatiles were not stripped or otherwise removed. The peaks on this figure representing volatile sulfur compounds resulting from degradation reactions demonstrate that removal of volatiles is crucial to the claimed process. Removal of only precipitates is insufficient to eliminate malodorous sulfur compounds which contribute to product degradation.

Figure 6:
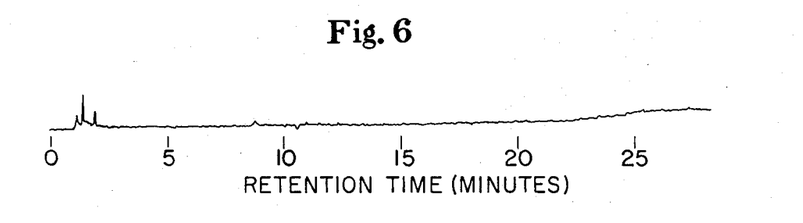
FIG. 6 is a trace of a gas chromatogram of dehydrated tea extract, citric acid, and distilled water boiled at 200° F. to 210° F. (93° C. to 99° C.) for one hour.

An alternative to the stripping step for removal of volatiles is to vigorously boil the acidified extract to vaporize the malodorous and off-flavor degradation compounds. FIG. 6 is a gas chromatogram of dehydrated tea extract, citric acid, and distilled water, after boiling one hour at about 200° F. to 210° F. (93° C. to 99° C.). FIG. 6 shows that the volatile sulfur compounds were removed by the boiling. This alternative can generate a burnt off-flavor in the resulting product because the high temperature required for boiling degrades the sugars present. For this reason stripping or evaporation of acidified tea extract is preferred to the boiling technique in the process of the present invention.

After removal of the volatile compounds, process water is added to the extract to replace water vaporized during the prior processing steps. Process water is used herein to mean distilled water, deionized water, or distilled deionized water.

The fourth step of the process of the present invention comprises cooling and separating solids from the extract. In addition to the precipitates formed during the degradation reactions, other solids which are precipitated by cooling consist chiefly of tannins and the creams. Tea creams result from caffeine reaction with polyphenolic compounds. Theaflavins and thearubigins are polyphenolic compounds generally referred to as tea tannins. Theaflavins are believed to give black tea its flavor. Thearubigin-caffeine complexes are less soluble in water, and cause turbidity and sediment in tea products and beverages prepared therefrom. When a tea extract is cooled turbidity develops and a flocculent precipitate commonly called cream is formed. The cream must be removed or solubilized. The tannins can be complexed with a variety of chemical agents, or an oxidation can be conducted to cleave the unsoluble tannin-caffeine complexes.

In the process of the present invention, theaflavin and thearubigin levels are reduced by the acid reaction and removal of the resultant precipitates. The presence of these polyphenolics at a reduced level results in a lower level of thearubigin-caffeine complexes. This enhances the stability to physical phase separation of the liquid tea products and of the tea beverages.

In the claimed process the extract is cooled to a temperature of from about 15° F. (−9° C.) to about 50° F. (10° C.), preferably to from about 25° F. (−4° C.) to about 45° F. (7° C.), most preferably to about 34° F. (1° C.). The solids precipitated by the cooling step and those precipitated by the acid reaction are then separated from the concentrated extract, preferably by centrifugation. The temperature is maintained at about 40° F. (4° C.) during centrifuging. Other suitable separation techniques, such as filtration, can be employed.

To the clarified extract, sweetener, lemon or other flavorings, colorants, and other optional ingredients can be added. The sweeteners, flavorings, and colorants can be natural or artificial. These are preferably blended in at ambient temperature with agitation for about 1 hour. These optional ingredients can alternatively be added to the tea extract in the first step of the process prior to the addition of acid. Preferably, these ingredients are blended into the final product for greatest effectiveness.

The liquid concentrate can then be packed directly into sterile containers. Due to the low product pH, additional thermal processing is not required for microbiological stability. Optionally, the liquid concentrate can be dried to a granular or powdered form by any of the conventional methods known in the art.

A liquid tea concentrate prepared by the process of the present invention comprises tea, water, and acid. Typically, the liquid tea concentrate comprises from about 0.05% to about 40% by weight tea, from about 0.05% to about 40% by weight acid, and water in an amount sufficient to make up to 100% by weight. A liquid tea mix concentrate prepared by the process of the present invention comprises tea, water, acid, sweetener, and flavors. Typically, the liquid tea mix concentrate comprises from about 0.05% to about 40% by weight tea, from about 0.05% to about 40% by weight acid, from about 0.5% to about 90% by weight sweetener, a minor amount of flavorings, and water in an amount sufficient to make up to 100% by weight. Both concentrates are shelf-stable at ambient temperature and can be stored for long periods of time without degradation of flavor and aroma. Both liquid concentrates are characterized by a low pH, low water activity, and low level of sulfur. The beverage prepared by diluting the concentrate with water is stable in flavor and appearance when refrigerated. Development of off-flavors as well as formation of precipitates or turbidity are prevented.

The liquid concentrates of the present invention have a pH of below about 3.0, preferably of about 2.5. This low pH renders the product microbiologically stable, even without sterilization or other thermal processing. The usual pH range for liquid tea concentrates or liquid tea mix concentrates is from about 3.4 to about 5.2.

The water activity at 24° C. of the liquid concentrates of the present invention is from about 0.75 to about 0.85, preferably about 0.81. The term "water activity" is used herein in its usual context to mean the ratio of the fugacity of water in the system being studied to the fugacity of pure water at the same temperature. Liquid tea concentrates or liquid tea mix concentrates typically have a water activity at 24° C. of from about 0.90 to about 0.97.

The liquid concentrates of the present invention are substantially free of sulfur compounds, having a maximum sulfur content of about 0.005% by weight, preferably less than 0.003% by weight. Conventional liquid tea concentrates or liquid tea mix concentrates have a sulfur content of from about 0.006% to about 0.022% by weight. The lower level of sulfur for the concentrate prepared by the claimed process is due to the removal of these compounds by the treatment of the tea during processing. This low level of sulfur greatly enhances the stability of the concentrates. By forcing the degradation reactions to occur, and removing the resultant off-flavor off-aroma volatiles, the development of these off-flavors and malodorous odors as a result of degradation upon aging is prevented in the final tea product.

A tea beverage for consumption is prepared by diluting the tea products prepared by the claimed process with water. This beverage is stable both in terms of flavor and appearance during refrigeration. The development of off-flavors and off-aromas is prevented because the beverage is substantially free of sulfur components. The appearance remains clear and the beverage is stable to physical phase separation due to the low levels of thearubigins. Precipitates which would cause a turbid appearance do not separate from the beverage. Turbidity measurements for the beverage of the present invention after refrigerated storage for 3 to 10 days range up to about 13 nephelometric turbidity unit (hereinafter NTU), preferably from about 6 to about 8 NTU.

Beverages prepared from conventional liquid tea concentrates, liquid tea mix concentrates, and instant teas, have turbidity measurements of from about 14 to about 40 NTU, 30 to about 40 NTU, and from about 40 to about 140 NTU, respectively, after refrigerated storage for 3 to 10 days.

The flavor stability of the beverage has been confirmed by expert taste panelists who found a smaller difference between the taste of tea beverage prepared from the concentrates prepared by the process of the present invention and those prepared from tea products made by conventional methods. The tea beverage prepared by the process of the present invention has a maximum degree of difference of about 0.5, typically about 0.4 when prepared from concentrate aged for two weeks if compared to the same beverage prepared from concentrate stored at 0° F. ($-18°$ C.). The degree of difference of conventional tea beverages when prepared from products after aging for two weeks is from about 0.8 to about 1.2 when compared to the same beverage prepared from product stored at 0° F. ($-18°$ C.).

It can be appreciated that still other embodiments or executions of this invention can be devised without departing from the scope and spirit of the invention, and without losing its advantages. Processing parameters can be reasonably altered, minor processing steps can be added or subtracted, or the sequence of some steps interchanged without departing from the scope of this invention. In particular, the process of the present invention forces degradation reactions to occur and removes the resulting reaction products. This prevents the development upon aging of off-flavors, malodorous odors, and precipitates in the tea products prepared according to the claimed process, and in the tea beverage prepared from them.

TESTING AND EVALUATION

The following tests were performed on the liquid tea products of the present invention.

A. pH

A Beckman Model 3500 Digital pH Meter (Beckman Instrument, Inc., Fullerton, CA 92634) was used to measure the pH of the liquid products and all of the tea beverages. The pH meter was calibrated with standard buffer solutions at pH 4, 7, and 10 (available from Curtin Matheson Scientific, Inc., Cincinnati, OH) before the samples were measured. Three different samples from each product were measured and then averaged. Tea beverages were prepared by dilution with tap water according to the instructions on the product package.

B. Water Activity

A Rotronic Hygroskop DT water activity system, available from Rotronic AG, Zurich, Switzerland, imported by Kaymont Instrument Corporation, P.O. Box 348, Huntington Station, N.Y. 11746, was used to measure the water activity of the liquid products. The temperature of the measuring stations and the products were controlled and regulated at 24° C. by a water bath, Thermomix 1420 BKU, available from B. Braun Instruments, South San Francisco, CA. The Hygroskop DT system was calibrated with standard solutions provided by Rotronic AG.

The liquid concentrate was placed in the plastic sample container of the Hygroskop DT system and the container placed in the measuring station. After fifteen minutes for equilibration, the temperature and water activity of the sample were recorded. These readings were repeated every ten minutes until a constant value was obtained. Three different samples from each liquid product were measured and averaged.

C. Volatile Sulfur

Relative levels of volatile sulfur compounds in the solutions of dehydrated tea extract, citric acid, and distilled water, were measured using gas chromatography. In this technique a suitable sample was injected into a heated injection port where volatile materials were vaporized. The volatile compounds were swept through a chromatographic column where resolution of the components occurred.

The components eluted from the column into a flame photometric detector. Compounds containing sulfur underwent decomposition reactions in the flame. The products of these reactions were thermally excited and generated an optical emission. This emission was focussed, filtered of any extraneous radiation and converted into an electrical signal by the flame photometric detector. The electrical signal was proportional to the levels of the volatile sulfur compounds in the sample.

A Hewlett-Packard gas chromatograph (Model 5880) equipped with a Hewlett-Packard flame photometric detector and Hewlett-Packard recording integrator (Level IV), each available from Hewlett-Packard, 1820 Embarcadero Rd., Palo Alto, CA 94303, were used. Gas flow rates for the detector were as follows: $O_2$-40 ml./min., $H_2$-75 ml./min., air-30 ml./min., and $N_2$-30 ml./min.

The injector temperature was maintained at 280° C., the detector temperature at 280° C., and the auxiliary temperature of the flame photometer detector at 200° C.

The instrument was operated at a split flow of 60 ml./min. and column head pressure of approximately 10 psi, yielding a column flow rate 2.7 ml./min. A DB-1701 fused silica capillary column (30 meters, 0.32 mm. I.D., 1 micron coating), available from J&W Scientific Inc., Rancho Cordova, CA, was used.

The sample size varied from 0.5 microliter to 1.0 microliter. Elution of the sample was accomplished with an oven temperature profile of 40° C. for 1.5 min. to 260° C. at 10° C./min.

D. Total Sulfur

Total sulfur was determined using the method described in *Official Methods of the Association of Official Analytical Chemists*, 13th ed., sections 3.062, 3.063, AOAC, Washington, D.C. (1980).

The following tests were performed on tea beverages prepared by diluting the tea products prepared by the process of the present invention with water, in a ratio of 1 to 7 and on beverages prepared from commercially available tea products made according to package directions.

A. Turbidity

The nephelometric method and nephelometric turbidity unit, as described in "Standard Methods for the Examination of Water and Waste Water", 14th ed., published by American Public Health Association, Washington, D.C., were used to determine the cloudiness or turbidity of the tea beverages. A Hach Ratio Turbidimeter, Model 18900-00, available from Hach Chemical Company, Loveland, Col., was employed. It was calibrated prior to each measurement using Latex Standard solutions provided by Hach Chemical Company. For the refrigerated beverages, the turbidity was measured at the refrigerated temperature. Three different samples from each beverage were measured and averaged.

B. Expert Taste Panel

Tea beverages were prepared from products prepared by the process of the present invention by diluting 1:7 with water. Tea beverages were prepared from the commercially available products according to the package instructions with water. All beverages were chilled to 40° F.

In order to evaluate the stability of the liquid concentrates, each product was stored at both 0° F. ($-18°$ C.) and 120° F. (49° C.). Beverages were prepared from each and evaluated by the panelists. The beverage made from the product stored at 0° F. was used as the standard and the other beverage compared to it.

To evaluate the stability of the tea beverages, freshly prepared beverage was used as the standard and was compared against the same beverage refrigerated for 3 to 10 days. The differences between the standard and compared beverages represented the effect of aging on the flavor and aroma.

The panelists would taste both beverages, evaluate their difference and assign a score of degree of difference (D.O.D.). The scale defining the D.O.D. for the flavor evaluation are listed in Table 1. The D.O.D. values of all the panelists for each product were averaged. A lower degree of difference determined by the panel correlates with increased similarity of the products tested.

TABLE I

| Numerical Value | Evaluation of Degree of Difference |
|---|---|
| 0.2 | The flavor of the test sample is not distinguishable from the flavor of the standard. |
| 0.3 | The flavor of the test sample is very close to the flavor of the standard, and it is difficult to distinguish from the standard. |
| 0.5 | The flavor of the test sample is slightly different from the flavor of the standard. |
| 0.8 | The flavor of the test sample is moderately different from the flavor of the standard. |
| 1.2 | This test sample is very different in flavor from the standard. |

The following examples are specific embodiments of the present invention but are not intended to limit it. All percentages are by weight unless otherwise stated.

EXAMPLE 1

Example 1 illustrates the process of the present invention for the preparation of a shelf-stable tea product.

Four hundred pounds of distilled water were placed in a steam jacketed stainless steel tank (150 gallons capacity, Model PZ-K, Walker Stainless Steel, Wisconsin). The agitating paddles in the tank were turned on and the distilled water was heated to 170° F. (77° C.). Twenty-six pounds of dehydrated tea powder (India 101, Tritea Company) were dissolved in the hot water. Seventy-four pounds of anhydrous citric acid granules (Miles Laboratories, Inc.) were dissolved in the hot tea solution. The tea-acid solution was kept at 170° F. (77° C.) for one hour with continuous agitation.

Then a vacuum was applied to the tank while the solution temperature was maintained at 170° F. (77° C.). The solution boiled and flashed. The vacuum in the tank was kept at 14 inches of Hg. After one hour, the heating was turned off. The vacuum was increased to 27 inches of Hg and evacuation lasted for another two hours. The solution bubbled and boiled continuously. Its temperature dropped gradually to 66° F. (19° C.). When solution temperature reached 66° F. (19° C.), the vacuum was stopped.

Three hundred and fifty pounds of tea-acid solution were retrieved from the heating tank. To this solution four hundred lbs. of distilled water were added. The diluted solution was stored at 34° F. (1° C.) overnight (about 18 hours). The chilled solution was centrifuged with a West Falia Separator (type SA14-47-076; rpm of bowl, 7560). The solution temperature before centrifuge was 34° F. (1° C.), and after centrifuge was 40° F. (4° C.). The clarified solution was stored at 34° F. (1° C.).

The stabilized tea-acid solution was blended with high fructose corn syrup, distilled water, lemon, and other natural flavors. A Lightnin Mixer (Model ND-1A, ¼ HP, 1725 rpm) was used to blend all the ingredients for one hour at ambient temperature and pressure. The concentrate was packed into sterile containers.

The resulting liquid tea mix concentrate had a pH of 2.5, and water activity of 0.81 at 24° C., and a sulfur content of 0.003% by weight. A tea beverage prepared from the concentrate after 5 days of refrigerated storage had a turbidity of 7, and after 10 days of refrigerated storage had a turbidity of 8. The beverage had a degree of difference of less than 0.5 when compared to the fresh beverage prepared from concentrate stored at 0° F. (−18° C.) by expert flavor panelists.

EXAMPLE 2

Example 2 illustrates the process of the present invention for different concentrations of tea, and also illustrates use of boiling to remove volatiles.

Tea-acid solutions were prepared using the following formulae.

| Sample | Ingredient as Percent by Weight | | |
|---|---|---|---|
| | Dehydrated Tea Extract | Citric Acid | Distilled Water |
| A | 3.0 | 8.2 | 88.8 |
| B | 5.9 | 16.0 | 78.1 |
| C | 9.6 | 26.3 | 64.1 |
| D | 5.1 | 27.1 | 67.8 |

Half of each sample was heated for 2 hours, vacuum stripped, cooled and centrifuged as in Example 1. The remaining half was boiled for 2 hours in a steam jacketed stainless steel tank with continuous agitation. These samples were then cooled and centrifuged as in Example 1. The clarified samples were blended with sweeteners and flavoring and were all stored at 120° F. for 2 weeks and evaluated by expert flavor panelists. No off-aromas developed. Tea beverages were prepared by diluting the concentrate 1:7 with water and evaluated for flavor. No off-flavors or off-aromas were present.

EXAMPLE 3

Example 3 illustrates the process of the present invention using an evaporator for removal of volatiles.

1.3 pounds of tea, 3.7 pounds of citric acid and 40 pounds of distilled water were blended by hand using a spatula. The mixture was poured into a Luwa scraped surface evaporator. The tea-acid solution was heated to about 150° F. to 200° F. (66° C. to 93° C.) and maintained at that temperature range for about 45 minutes.

The tea-acid solution was then pumped at the rate of 55 gallons per hour through the evaporator and a vacuum of about 28 to 30 inches of Hg was applied to the evaporator. The steam shell was maintained at about 250° F. (121° C.). The evaporated solution was mixed back with the feed, and the mixture was recycled into the evaporator for further removal of volatile compounds. The recycling process lasted for about 2 hours. The evaporated product was refrigerated for about 18 hours.

The solution was then cooled to about 40° F. (4° C.) and centrifuged to remove precipitates using a West Falia Separator (type SA14-47-096 at 7560 rpm). The clarified solution was blended with high fructose corn syrup and lemon flavoring at ambient temperature.

Samples were stored at 120° F. (49° C.). After 1, 2 and 3 weeks of storage the samples were evaluated by expert flavor panelists. No off-aromas were detected. Tea beverages were prepared by diluting the concentrate 1:7 with water and evaluated by expert flavor panelists. No off-flavors or off-aromas were detected.

EXAMPLE 4

Example 4 illustrates the process of the present invention using a falling film evaporator for removal of volatiles.

About 7 gallons of tea-acid solution of Example 3 not subjected to evaporation was heated to 170° F. (77° C.) in a heat exchanger. The heated tea-acid solution was then passed through a falling film evaporator. A vacuum of 23 inches Hg was applied to the evaporator. The solution flashed and was cooled to 150° F. (66° C.). The evaporator was heated with steam to reheat the solution to 170° F. (77° C.). The total tea-acid solution was passed through the evaporator once. Fifty-four and one-half pounds of tea-acid solution yielded eleven pounds of condensate. Twenty-eight pounds of tea-acid solution were recovered as concentrate. The condensate retained off-odor but the concentrate was free of off-odors. The concentrate was diluted with distilled water and stored at 40° F. (4° C.) for two days. The chilled solution was centrifuged to remove the precipitates. The clarified solution was blended with a sweetener and flavoring. After storage for one week at 120° F. (49° C.), the product was evaluated by expert flavor panelists. No off-aroma developed. Tea beverages were prepared by diluting 1:7 with water and evaluated. No off-aroma and off-flavors were detected.

What is claimed is:

1. A process for the preparation of a shelf-stable liquid tea mix concentrate having a pH of below about 3.0, a water activity of about 0.75 to about 0.85 and a maximum sulfur content of less than 0.005% comprising:
   (a) acidifying a tea extract by adding from about 0.05% to about 40% by weight of a tea-acid-water mixture of an edible food grade acid, the tea extract prepared by mixing tea leaves with water in a ratio of from about 1:3 to about 1:50, extracting at from about 100° F. to about 210° F. for about 3 to about 100 minutes and separating the tea leaves from the extract, or mixing dehydrated tea extract with water, the dehydrated tea extract comprising from about 0.5% to about 30% by weight of the tea extract and water mixture;
   (b) heating the acidified extract to a temperature of at least 120° F. for at least about 15 minutes to develop malodorous and off-flavor degradation compounds;
   (c) removing malodorous and off-flavor degradation volatiles from the acidified heated extract by stripping, evaporation, flash evaporation or boiling; and
   (d) cooling the extract to a temperature of from about 15° F. to about 50° F. and separating solids from the extract to yield a clarified shelf-stable tea concentrate.

2. The process of claim 1 wherein the ratio of tea leaves to water is from about 1:10 to about 1:30.

3. The process of claim 1 wherein the acid comprises an organic acid selected from the group consisting of fumaric, citric, malic, acetic, lactic, propanoic, adipic, tartaric, and succinic.

4. The process of claim 3 wherein the acid comprises citric acid.

5. The process of claim 1 wherein the acid comprises an inorganic acid selected from the group consisting of phosphoric, carbonic, and sodium hydrogen phosphate.

6. The process of claim 1 wherein the mixture is heated to at least 170° F. (77° C.) for at least 1 hour.

7. The process of claim 1 wherein the removing of volatiles from the acidified extract comprises vacuum stripping at from about 14 to about 27 inches of mercury for from about 3 to about 4 hours.

8. The process of claim 1 additionally comprising the addition of process water prior to cooling the extract.

9. The process of claim 1 wherein the extract is cooled to a temperature of from about 25° F. (−4° C.) to about 45° F. (7° C.).

10. The process of claim 1 wherein the solids are separated by centrifugation.

11. The process of claim 1 additionally comprising adding sweetener or flavorings or both to the clarified extract.

12. A shelf-stable tea product prepared according to claim 1.

13. A shelf-stable liquid tea mix concentrate prepared according to claim 11.

14. A process for the preparation of a shelf-stable liquid tea mix concentrate having a pH of below about 3.0, a water activity of about 0.75 to about 0.85 and a maximum sulfur content of less than 0.005% comprising:
 (a) acidifying a tea extract by adding from about 0.005% to about 40% by weight of the tea-acid-water mixture of an edible food grade acid, the tea extract prepared by mixing tea leaves with water in a ratio of from about 1:3 to about 1:50, extracting at from about 100° F. to about 210° F. for about 3 to about 100 minutes and separating the tea leaves from the extract, or mixing dehydrated tea extract with water, the dehydrated tea extract comprising from about 0.5% to about 30% by weight of the tea extract and water mixture;
 (b) heating the acidified extract to a temperature of at least 120° F. for at least about 15 minutes to develop malodorous and off-flavor degradation compounds;
 (c) removing volatiles from the extract of step (b) by vacuum stripping at about 5 to 29 inches of mercury for about 5 minutes to about 4 hours; and
 (d) cooling the extract to a temperature of from about 15° F. to about 50° F. and separating solids from the extract to yield a clarified shelf-stable tea concentrate.

15. The process of claim 14 additionally comprising blending a sweetener or flavorings or both with the clarified extract.

* * * * *